May 8, 1928.
E. M. MAYER
1,668,650
HANDLE ATTACHMENT FOR BABY WALKERS
Filed May 12, 1925
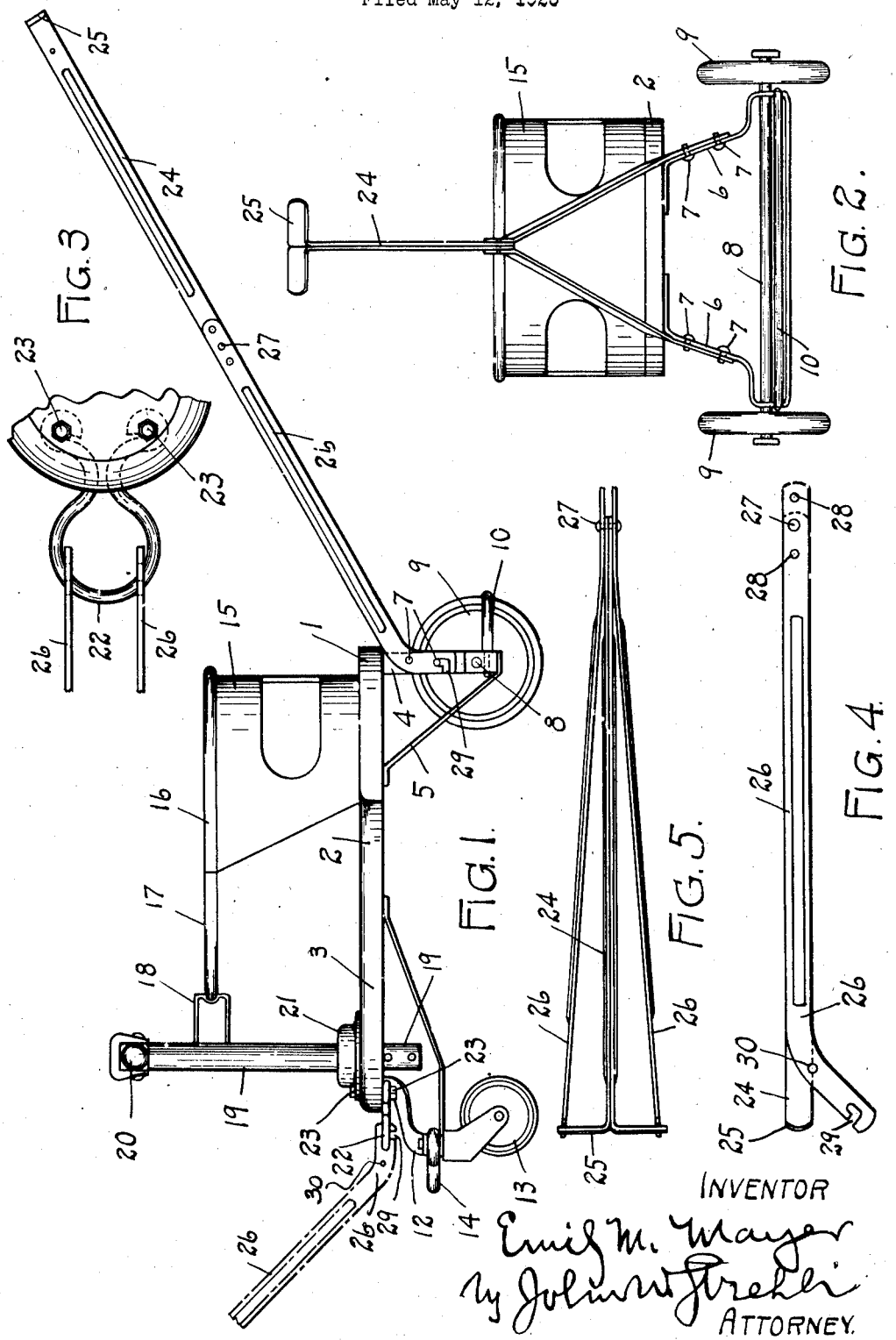
INVENTOR
Emil M. Mayer
By John W. Strehli
ATTORNEY.

Patented May 8, 1928.

1,668,650

UNITED STATES PATENT OFFICE.

EMIL M. MAYER, OF CINCINNATI, OHIO.

HANDLE ATTACHMENT FOR BABY WALKERS.

Application filed May 12, 1925. Serial No. 29,831.

My attachment is employed in connection with baby walkers, a small vehicle used by small children to acquire the art of walking, and also used to furnish play and amusement for the child. The primary use for the baby walker is to teach the art of walking, however, when the little child becomes tired or becomes older, the baby walker may be used as a small carriage or buggy for hauling or pushing the child from place to place, for the amusement of the child, to take it out for an airing and for the convenience of the mother or anyone in charge of the child.

My handle attachment is very simple in construction, cheap of manufacture, and highly efficient in use, and possesses marked utility.

It may, with equal facility be attached to the front of the vehicle for pulling purposes or it may be attached at the rear of said vehicle for steering and pushing the same. It can be quickly attached and disengaged, and its peculiar construction tends to lock it into the position in which it has been placed, so that an effort must be made to dislodge it.

In the accompanying drawing forming part of this specification:

Fig. 1, is a side elevation of one form of baby walker, with my new handle attachment in position, one of the rear wheels of the baby walker being removed to show construction, the attachment being shown in position at both the front and rear of the vehicle and being partly broken away at the front end of said vehicle, Fig. 2, is a rear elevation of the construction shown in Fig. 1, Fig. 3, is an enlarged detail of the eyebolt fastening used by me at the front part of the vehicle, for engaging with the handle attachment, Fig. 4, is a side elevation of the handle attachment shown folded together and detached from the vehicle, and Fig. 5, is a plan view of parts and construction shown in Fig. 4.

The present form of baby walker or vehicle herein shown is usually formed of a body element 1, having a seat part 2 and front cut away part 3, made of any form or design found practicable.

The body element 1, is supported at the rear by a frame 4, braced by the brace bar 5 and having the upwardly extending members 6, on which are securely mounted pins, extensions or small studs 7.

I provide a rear axle 8 mounted in frame 4 and provided with wheels 9. I also provide, at the rear, a bumper 10.

At the forward part of the vehicle I provide a frame 12, in which I mount the caster wheels 13 and this frame acts as an axle and also as a bolster for the vehicle. A bumper 14 is mounted in the frame 12, in any suitable manner.

On the body element 1, at the seat part 2, I provide a metal back support 15, usually provided at its top edge with a bead or reinforcement rim 16. A continuation of this bead or rim enforcement 16, is shown in the form or shape of a curved or semi-circular child containing support 17, which may be supported at its forward extremity by a bracket 18, or it may be firmly connected to the bead or reinforced rim part 16 of the metal back support 15.

A post or standard 19 is mounted securely in the forward extension part 3, of the body part 1 and is provided with a handle as 20, at its upper extremity, and at the point where it meets the part 3 of body 1, I provide a reinforcing member 21. On the under side of forward part 3 of body 1, I securely connect an eyelet 22, by means of bolts 23.

I have now described one form of a baby walker vehicle of a preferred form for use in connection with my handle attachment so that the use of the handle attachment may be clear and well understood. I may use the attachment in connection with any other form of baby walker or child's vehicle. I have also set forth means at both the front and rear of the vehicle for engagement with my handle attachment, but I may use any other form found practicable.

I will now describe the handle attachment and state that it is composed of a handle element 24, terminating in a handle 25. To this handle element 24 I connect at its forward end, two handle arms 26, which are pivoted at point 27, to the handle element 24. I provide holes as 28 to lengthen or shorten the handle element 24. At the lower extremity the handle arms are curved somewhat and are each provided with a recess 29 and an engagement hole 30.

These handle arms 26 diverge from a point where the pivotal point 27 is located and are of a springy nature, so that they can be compressed or pulled apart as occasion requires and thus by reason of their spring-like tendency assist in locking that attachment in position against disengagement, as will now be described.

When the handle is used at the front of the vehicle, it is used generally for pulling same and this is accomplished by compressing the handle arms 26 and placing the recesses 29 in engagement with the eyelet 22 (see Figs. 1 and 3). The arms in this case on account of having been previously compressed, press outwardly or laterally locking them into position in the eyebolt, and when in this position the attachment can only be removed by replacing the arms 26 into a more closed position and then relieving them from engagement with the eyebolt.

When the attachment is to be used as a steering or push handle the recesses 29 and the holes 30 are brought into engagement with the pins 7, by extending or pulling the arms 26 apart to such an extent that the engagement will be made; the arms 26 are thus held firmly in position, as the arms have a tendency to spring back into normal position. In this way they are locked and can only be disengaged by a physical agency.

These arms 26 may be made of any form or shape and of a construction to best make a satisfactory engagement with the eyebolt and also with the pins, against accidental or ordinary displacement.

What I claim as new and my invention and desire to secure by Letters Patent is:

1. The combination with a small child's vehicle having attachment means at its front and rear ends, of a quick-detachable handle for said vehicle having means at one end for engaging the attachment means at either end of the vehicle, said handle including resilient diverging arms, the free ends of which are movable away from each other for engagement with one of the attachment means of the vehicle, the arms when engaging the last mentioned attachment means tending to move toward each other under their own resiliency, and the arms being movable toward each other for engaging the other attaching means of the vehicle, the arms when engaging the last mentioned means, tending to move away from each other under their own resiliency.

2. The combination with a vehicle having attachment means, of a handle including diverging resilient arms, each arm provided near its outer end with an aperture and a notch spaced from the aperture to detachably engage the attachment means of the vehicle and rigidly connect the handle thereto.

3. The combination with a vehicle having spaced attaching elements at one end, and spaced attaching elements at its other end, the last mentioned attaching elements being nearer to each other than the first mentioned attaching elements, of a quick detachable handle for said vehicle having means at one end for engaging the attaching elements at either end of the vehicle, said handle including resilient diverging arms, the free ends of which are movable away from each other for engagement with the attaching elements at one end of the vehicle, the arms when engaging the last mentioned attaching elements, tending to move toward each other under their own resiliency, and the arms being movable toward each other for engaging the attaching elements at the other end of the vehicle, the arms when engaging the last mentioned attaching elements, tending to move away from each other under their own resiliency.

4. The combination with a vehicle having attachment means at its front and rear ends, of a combined pushing and pulling handle including resilient diverging arms, each arm having its outer end bent relatively to the remainder of the arm, and being provided with attachment means, the attachment means of said arms being shaped to detachably engage the attachment means at either end of the vehicle, and to rigidly connect the handle thereto, the free ends of said arms being movable away from each other for engagement with one of the attachment means of the vehicle, the arms when engaging the last mentioned attachment means, tending to move toward each other under their own resiliency, and the arms being movable toward each other for engaging the other attaching means of the vehicle, the arms when engaging the last mentioned means, tending to move away from each other under their own resiliency.

5. An handle for pushing or pulling a vehicle, comprising a tongue and diverging resilient arms pivotally connected to one end of said tongue, a hand engaging part at the other end of the tongue, each of said arms having its outer end extending at an angle to the edges of the remaining portion of the arm, each arm provided near its outer end with an aperture and a notch spaced from the aperture to detachably engage the vehicle to be pushed or pulled.

In testimony whereof I affix my signature at Atlantic City, New Jersey, this 6th day of May, 1925.

EMIL M. MAYER.